United States Patent
Dierksmeier et al.

(10) Patent No.: US 9,856,884 B2
(45) Date of Patent: Jan. 2, 2018

(54) VALVE FOR GAS TURBINE ENGINE

(71) Applicant: Rolls-Royce North American Technologies, Inc., Indianpolis, IN (US)

(72) Inventors: Douglas David Dierksmeier, Franklin, IN (US); Daniel Kent Vetters, Indianpolis, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 531 days.

(21) Appl. No.: 14/318,482

(22) Filed: Jun. 27, 2014

(65) Prior Publication Data
US 2014/0341708 A1    Nov. 20, 2014

Related U.S. Application Data

(63) Continuation of application No. PCT/US2012/072096, filed on Dec. 28, 2012.
(Continued)

(51) Int. Cl.
*F01D 9/06* (2006.01)
*F01D 11/24* (2006.01)
(Continued)

(52) U.S. Cl.
CPC ........... *F04D 27/0238* (2013.01); *F01D 9/06* (2013.01); *F01D 11/24* (2013.01); *F02C 9/18* (2013.01);
(Continued)

(58) Field of Classification Search
CPC . F01D 9/06; F01D 9/065; F01D 11/14; F01D 11/16; F01D 11/20; F01D 11/22;
(Continued)

(56) References Cited

U.S. PATENT DOCUMENTS 3,074,432 A * 1/1963 Beale .................. F04D 27/0215
137/625.28
3,588,268 A * 6/1971 Hampton .............. F04D 27/023
415/145

(Continued)

FOREIGN PATENT DOCUMENTS

GB          2063374 A     6/1981

OTHER PUBLICATIONS

International Search Report and Written Opinion, PCT/US2012/072096, dated Mar. 18, 2013.
(Continued)

*Primary Examiner* — Christopher Verdier
*Assistant Examiner* — Christopher R Legendre
(74) *Attorney, Agent, or Firm* — Barnes & Thornburg LLP

(57) ABSTRACT

A gas turbine engine is disclosed having an air injection system useful to supply a relatively pressurized air to a flow path of a compressor. The air injection system includes a port cover operable to open and close a port through which the air can flow to the compressor from a relatively pressurized source. The port cover extends circumferentially around the gas turbine engine and can include a portion that is anchored and an opposite portion coupled to an actuator. Movement of the actuator causes the port cover to open and close the port. Biasing members can be used to urge the port cover into one of an open and closed position against the movement of the actuator.

15 Claims, 2 Drawing Sheets

Related U.S. Application Data

(60) Provisional application No. 61/581,416, filed on Dec. 29, 2011.

(51) Int. Cl.
  *F02C 9/18* (2006.01)
  *F04D 27/02* (2006.01)

(52) U.S. Cl.
  CPC .... *F05D 2270/101* (2013.01); *F05D 2270/17* (2013.01)

(58) Field of Classification Search
  CPC .......... F01D 11/24; F01D 25/12; F01D 25/14; F02C 7/23; F02C 9/182; F04D 27/0207; F04D 27/0215; F04D 27/023; F04D 27/0238; F05D 2270/101; F05D 2270/17
  See application file for complete search history.

(56) References Cited

U.S. PATENT DOCUMENTS

| | | | |
|---|---|---|---|
| 4,343,592 A * | 8/1982 | May | F01D 11/22 415/127 |
| 4,708,588 A * | 11/1987 | Schwarz | F01D 5/081 415/115 |
| 4,785,624 A | 11/1988 | Smith et al. | |
| 5,141,391 A | 8/1992 | Acton et al. | |
| 5,485,717 A * | 1/1996 | Williams | F02C 9/18 60/226.1 |
| 5,601,402 A | 2/1997 | Wakeman et al. | |
| 5,692,702 A * | 12/1997 | Andersson | F04D 29/663 181/206 |
| 5,899,058 A | 5/1999 | Narcus et al. | |
| 5,984,625 A | 11/1999 | Murray et al. | |
| 6,125,626 A * | 10/2000 | El-Aini | F01D 5/10 60/226.1 |
| 6,487,491 B1 | 11/2002 | Karpman et al. | |
| 6,692,222 B2 | 2/2004 | Prinz et al. | |
| 6,779,967 B2 * | 8/2004 | Friedl | F02C 7/12 415/116 |
| 7,220,097 B2 | 5/2007 | Boeck | |
| 7,967,556 B2 * | 6/2011 | Gummer | F04D 27/0215 415/144 |
| 8,162,591 B2 * | 4/2012 | Grauer | F01D 5/145 415/108 |
| 8,182,209 B2 * | 5/2012 | Brault | F01D 17/105 415/144 |
| 8,757,508 B2 * | 6/2014 | Haasz | F01D 9/065 236/101 R |
| 8,959,926 B2 * | 2/2015 | Bil | F02C 9/18 415/58.4 |
| 9,175,690 B2 * | 11/2015 | Schutz | F04D 27/0215 |
| 9,347,334 B2 * | 5/2016 | Joe | F01D 11/24 |
| 9,394,801 B2 * | 7/2016 | Willett, Jr. | F01D 11/22 |
| 2003/0161719 A1 | 8/2003 | Friedl et al. | |
| 2004/0081552 A1 * | 4/2004 | Guemmer | F04D 29/684 415/112 |
| 2006/0104805 A1 * | 5/2006 | Gummer | F04D 27/0215 415/58.5 |
| 2008/0131270 A1 | 6/2008 | Paprotna et al. | |
| 2009/0097965 A1 | 4/2009 | Swanson et al. | |
| 2009/0232636 A1 * | 9/2009 | Grauer | F01D 5/145 415/58.5 |
| 2014/0341708 A1 * | 11/2014 | Dierksmeier | F04D 27/0238 415/1 |

OTHER PUBLICATIONS

Strazisar, AJ, et al., "Compressor Stall Control Through Endwall Recirculation," Proceedings of ASME Turbo Expo 2004, Vienna, Austria, Jun. 14-17, 2004.

* cited by examiner

VALVE FOR GAS TURBINE ENGINE

CROSS-REFERENCE TO RELATED APPLICATIONS

The present application is a continuation of PCT Application No. PCT/US2012/072096, filed Dec. 28, 2012, which claims the benefit of U.S. Provisional Patent Application 61/581,416, filed Dec. 29, 2011, each of which is incorporated herein by reference.

TECHNICAL FIELD

The present invention generally relates to gas turbine engine valves, and more particularly, but not exclusively, to tip injection valves used in gas turbine engines.

BACKGROUND

Providing valves for use in gas turbine engines remains an area of interest. Some existing systems have various shortcomings relative to certain applications. Accordingly, there remains a need for further contributions in this area of technology.

SUMMARY

One embodiment of the present invention is a unique valve used in a gas turbine engine. Other embodiments include apparatuses, systems, devices, hardware, methods, and combinations for opening and closing flow paths in gas turbine engines. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
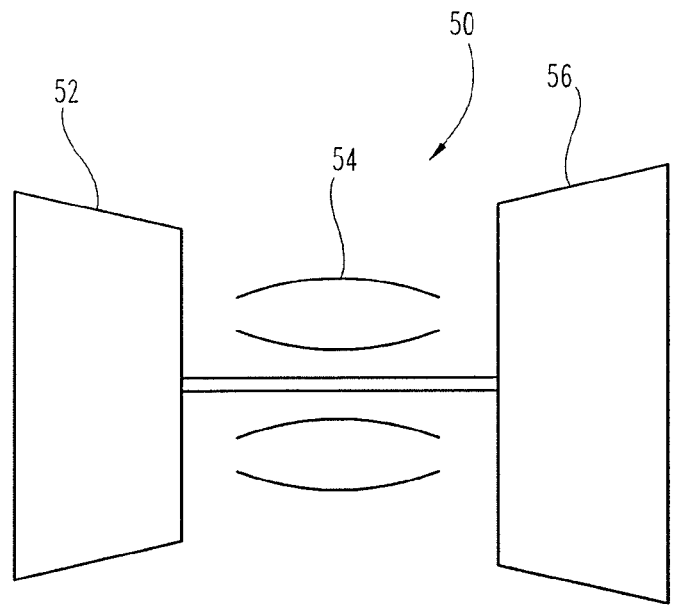
FIG. 1 depicts one embodiment of a gas turbine engine.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

With reference to FIG. 1, a gas turbine engine 50 is disclosed having a compressor 52, combustor 54, and turbine 56. The gas turbine engine 50 takes the form of a turbojet in the illustrative embodiment and can take other forms in different embodiments. For example, the gas turbine engine 50 can take the form of a turbofan, turboprop, or turboshaft engine, to set forth just a few non-limiting alternatives. In some forms the gas turbine engine 50 can have any number of spools in addition to the single spool depicted in the figure. In some applications the gas turbine engine 50 can be coupled to a vehicle, such as but not limited to an aircraft, and used as a power plant. As used herein, the term "aircraft" includes, but is not limited to, helicopters, airplanes, unmanned space vehicles, fixed wing vehicles, variable wing vehicles, rotary wing vehicles, unmanned combat aerial vehicles, tailless aircraft, hover crafts, and other airborne and/or extraterrestrial (spacecraft) vehicles. Further, the present inventions are contemplated for utilization in other applications that may not be coupled with an aircraft such as, for example, industrial applications, power generation, pumping sets, naval propulsion, weapon systems, security systems, perimeter defense/security systems, and the like known to one of ordinary skill in the art.

Figure 2:
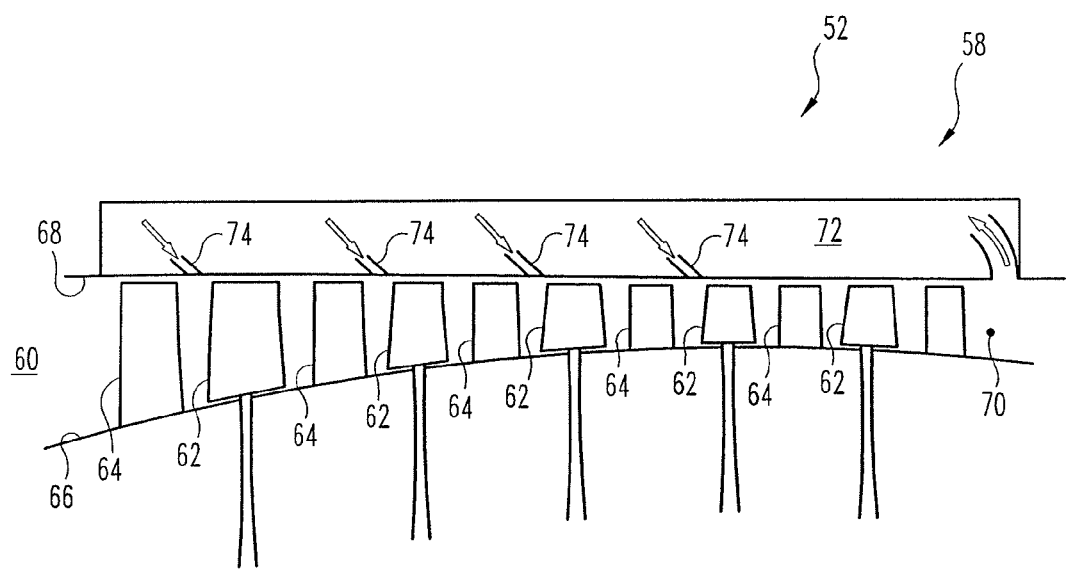
FIG. 2 depicts an embodiment of an air injection system.

Turning now to FIG. 2, one embodiment of the compressor 52 is shown having an air injection system 58 which is useful to supply a relatively pressurized air to a flow path 60 of the compressor to alleviate a tip stall phenomena in the rotating blades, to set forth just one non-limiting use. In some embodiments it will be appreciated that the injection system 58 can be used to inject air or any other suitable working fluid. For ease of description, the injection system 58 will be described below with regard to injecting air. The compressor 52 of the illustrative embodiment includes a plurality of rows of blades 62 and a plurality of rows of vanes 64 but in other embodiments can include fewer or greater number of rows of either or both the blades 62 and vanes 64. The blades 62 rotate about an axis and successively raise the pressure of a working fluid flowing in the flow path 60 between a radially inner wall 66 and a radially outer wall 68.

In the illustrative embodiment the air injection system 58 withdraws relatively pressurized air from a compressor discharge 70 of the compressor 52 and delivers it to the tip regions of the blades 62. In other embodiments the air injection system 58 can withdraw relatively pressurized air from a location upstream of the compressor discharge 70. In still other embodiments the air injection system 58 can use a source for relatively pressurized air such as a tank having a compressed working fluid. In yet further embodiments the air injection system 58 can withdraw air from a location within the flow path 60 of the compressor or elsewhere in or around the gas turbine engine and further increase the pressure of the air with a device such as a supplementary compressor before delivering the air to the tip region of the blades 62. In short, the relatively pressurized air can be provided from a variety of sources and/or locations.

The air injection system 58 of the illustrative embodiment includes a plenum 72 in to which relatively pressurized air from the compressor discharge 70 enters. The plenum 72 is coupled to ports 74 which direct the relatively pressurized air towards the flow path 60. In some forms of the air injection system 58, the plenum 72 may not be needed and instead individual pathways can be used between a pressure source and the ports 74. For example, the air injection system 58 can include a pathway between the compressor discharge 70 and one of the ports 74. In some forms the pathways can be branched such as would be the case if a pathway extended from the compressor discharge and were bifurcated to supply relatively pressurized air to two of the ports 74. Various other configurations of providing the pressurized air to one or more of the ports 74 are also contemplated herein.

The ports 74 of the illustrative embodiment provide air to the flow path 60 based upon the pressure in the plenum 72, the relative configuration of the ports 74, and the location of each of the individual ports 74 relative to the compressor station, among other possible causes. In the embodiments of FIG. 2 the ports 74 collectively deliver air to the compressor 52, but in different embodiments the ports 74 can be individually controlled to provide air either collectively or selectively. Thus, the air injection system 58 can be configured to provide air to the flow path 60 using less than the number of ports 74 depicted in the illustrated embodiment.

Figure 3:
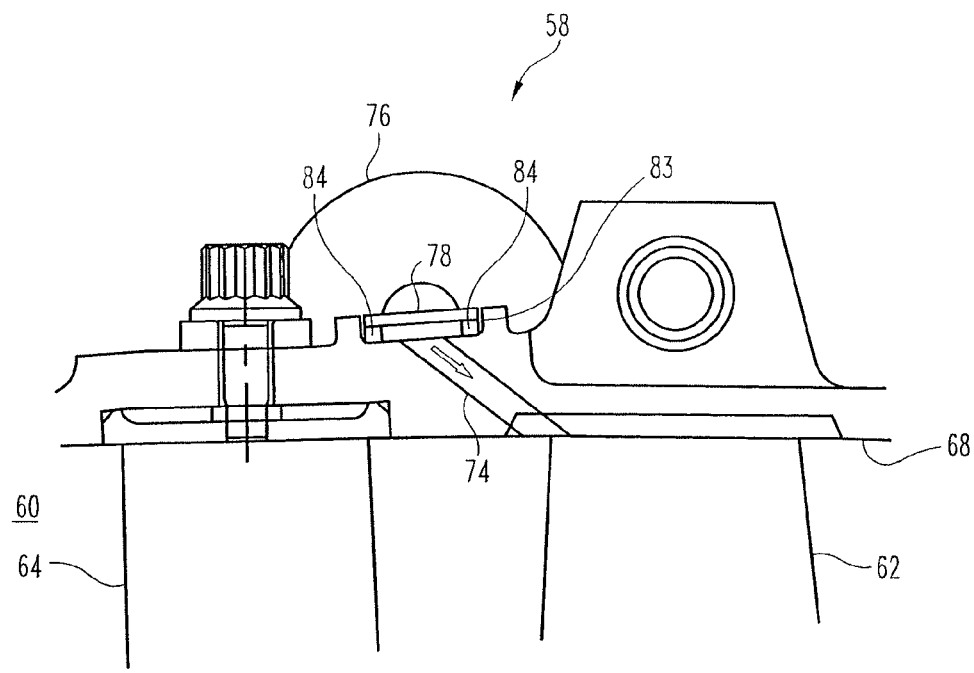
FIG. 3 depicts an embodiment of an air injection system.
Figure 4:
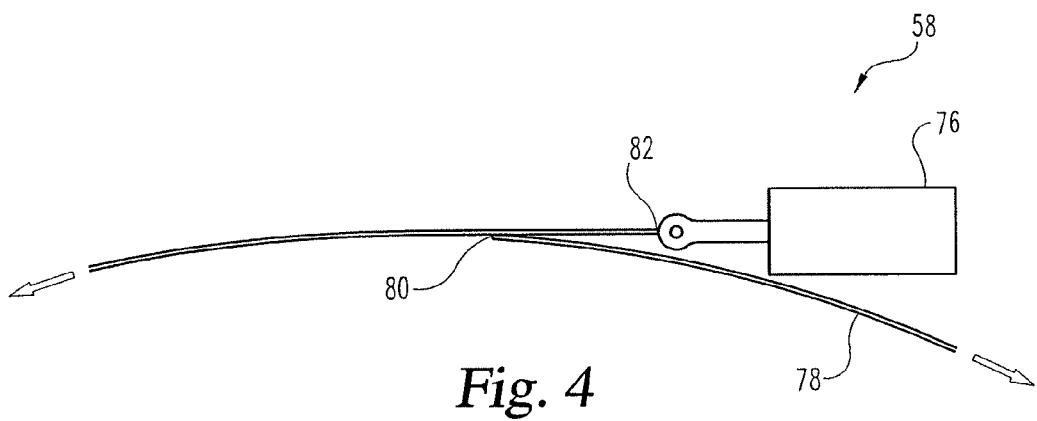
FIG. 4 depicts an embodiment of an air injection system.

Turning now to FIGS. 3 and 4, an embodiment of the air injection system 58 is shown that delivers air to the flow path 60 downstream of a vane 64. The port 74 in the embodiment in FIG. 3 is shown as delivering air to the leading edge of the blade 62. In other embodiments the port 74 can deliver air further upstream or further downstream than is depicted in the illustrative embodiment. Air can be delivered at a variety of angles with respect to the outer wall 68 in addition to the angle depicted in FIG. 3. In some forms the port 74 need not include an extended passage to an opening in flow path 60.

The air injection system 58 includes an actuator 76 and a port cover 78 used to selectively open and close one or more of the ports 74. The actuator 76 is depicted as a linear actuator in the illustrative embodiment but can take on other forms in different embodiments. The actuator 76 can be a pneumatic actuator, hydraulic actuator, electromechanical actuator, and a piezoelectric actuator, among potential others. The actuator 76 can be capable of actuating the port cover 78 to a variety of positions at a variety of rates. In some embodiments the actuator 76 can be configured to position the port cover 78 in either an open or closed position. In other embodiments the actuator 76 can provide position control at a variety of intermediate positions between an open or closed position.

The port cover 78 in the illustrative embodiment takes the form of a band that circumferentially extends around the compressor 52, though for illustration purposes FIG. 4 shows only a view of only a portion of the port cover 78 which extends around the entirety of the circumference of the gas turbine engine 50. In some forms the band can extend less than an entire circumference of the gas turbine engine 50. The embodiment in FIG. 3 depicts a cross section of the port cover 78 having a rectilinear shape, but in other embodiments the port cover 78 can include other shapes and or have one or more protrusions or offsets extending toward the port 74. The port cover 78 is structured to seat against the gas turbine engine structure, such as a compressor case, and can do so along a 360 degree cylindrical surface, or an interrupted cylindrical surface. Raised bosses can be provided in either the port cover 78 or the surface against which it seats to open and close the ports 74. Portions of the port cover 78 and/or the port 74 can have a curvature to facilitate opening and closing of the passage. In one non-limiting embodiment a contact pad at each port 74 can have a curvature. In one form the contact pad can have a cylindrical curvature at the centerline of the port 74 with increased curvature as the surface traverses tangentially away from the port 74 centerline. In short, the port cover 78 and/or the port 74 can have any various arrangements to facilitate opening and closing.

The band 78 has one portion anchored to the gas turbine engine 50 at an anchor portion 80 and another portion that is coupled to the actuator 76 at a connection portion 82. The anchor portion 80 can be coupled to the gas turbine engine 50 such that it is restrained to move in the circumferential direction. One such technique of anchoring the portion 80 is to weld, rivet, bolt, or otherwise affix the portion 82 to the gas turbine engine 50. In some forms the port cover 78 can include side tabs structured to fit into a slot(s) or groove(s) in the gas turbine engine 50. The port cover 78 could be anchored with a piece spanning one or both sides of the port cover 78 which clamp the band in place. In still further forms the anchor portion 80 can be anchored to the gas turbine engine via a hinge or other device that permits some relative motion but otherwise limits circumferential relative movement.

The connection portion 82 can be moved using the actuator 76 to manipulate the band, such as by stressing and moving at least a portion of the band, into a relationship that opens or closes the ports 74. In the illustrated embodiment the band has an effective length that extends above the ports 74 and an excess length beyond that needed to cover the ports 74. Both the effective length and the excess length can be variable depending on whether the band is used to open or close the ports 74. When the actuator 76 is used to open and close the ports 74, the connection portion 82 can be moved such that the effective length is greater than the circumferential periphery of the gas turbine engine structure to which it is associated for such purposes. In this position an offset distance is created between the band and the ports 74 thus exposing the ports 74 to the plenum 72. When the ports 74 are to be closed, the actuator shortens the effective length of the band that envelops the ports 74 such that the band is placed into contact with a structure or component of the gas turbine engine 50.

The port cover 78 can be moved within a predefined guide, but not all embodiments need be constrained. In some forms the port cover 78 can be situated in a slot 83 as shown in FIG. 3, but other techniques of guiding the cover 78 can be used such as a number of spaced discrete posts.

In the embodiment illustrated in FIG. 3, the air injection system 58 includes biasing member 84 that urges the port cover 78 into a position to open the ports 74, but not all embodiments need include the biasing member 84. Furthermore, although the illustrated depicts biasing member 84 as urging the port cover 78 into a position to open the ports 74, in some forms additionally and/or alternative biasing member 84 can be used to urge the port cover 78 into the closed position. The actuator 76 can be configured to work against the biasing member. In some embodiments the biasing member 84 can be made integral to the port cover 78 and can protrude axially forward and axially aft further than the cover 78.

Two separate biasing members 84 are depicted on either side of the port 74, but in some embodiments any number of biasing members 84 can be used. In addition, the biasing members can be located in other positions depending on the application. In various embodiments the biasing member 84 can be placed in compression and/or tension depending on the application. For example, in one form the biasing member 84 can be an energy storage device such as a spring or elastomeric material. To set forth just a few non-limiting examples, the biasing member 84 can take the form of a circumferentially extending wave spring, or can have a form in which one end is attached to the cover 78 and the other end formed to protrude slightly inward. In short, the biasing member 84 can take on a variety of shapes, sizes, types, etc. Furthermore, any number of biasing members 84 can be used to urge the port cover 78 into a position relative to the ports 74. For example, a number of biasing members 84 can be used along a circumferentially extending channel rather than a single biasing member.

One aspect of the present application provides an apparatus comprising a gas turbine engine having a compressor that includes a row of rotatable blades for compressing a working fluid between a first flow surface and a second flow surface of the compressor, a flow path operable to deliver an injection fluid radially inward to the compressor through an air flow port of the first flow surface, and an air injection system for the compressor including a valve band extending across the air flow port and moveable in a circumferential direction relative to the gas turbine engine to selectively permit the injection fluid to flow into the compressor.

A feature of the present application provides wherein the injection fluid is working fluid withdrawn from a flow path of the gas turbine engine at a location axially downstream of the air flow port and the flow path is operable to deliver the injection fluid to a tip region of the compressor.

Another feature of the present application provides wherein the valve band moves radially to open and close the air flow port.

Yet another feature of the present application further includes an energy member to resist closing of the air flow port with the valve band.

Still yet another feature of the present application further includes an actuator coupled to the valve band and operable between a first position and a second position wherein actuation of the actuator causes the valve band to circumferentially move to selectively open and close the air flow port.

Yet still another feature of the present application provides wherein the actuator is a pneumatic actuator that actuates the valve band in a linear direction, and wherein the valve band includes a first end that is fixed relative to the air flow port such that it is discouraged from moving in the circumferential direction.

A further feature of the present application provides wherein the gas turbine engine includes a plurality of compressor stages, a plurality of air flow ports leading to the plurality of compressor stages, and a plurality of valve bands that selectively permit flow into the compressor, each of the plurality of valve bands independently operable.

Another aspect of the present application provides an apparatus comprising a gas turbine engine having a compressor in fluid communication with a flow path structured to deliver a relatively pressurized fluid to a tip region of the compressor through a compressor opening, and a valve that selectively opens and closes the compressor opening to permit the relatively pressurized fluid into the compressor, the valve including a moveable component coupled to a biasing member that urges the valve to an open position, the moveable component coupled to an actuator capable of urging the valve to a closed position.

A feature of the present application provides wherein the moveable component includes an end portion anchored to the gas turbine engine.

Another feature of the present application provides wherein the moveable component is a band that extends circumferentially around the compressor.

Yet another feature of the present application provides wherein the band is constrained by a band guide surface.

Still another feature of the present application provides wherein the biasing member is integral with the moveable component.

Yet still another feature of the present application provides wherein the actuator is operable to variably position the valve between an open position and a closed position.

Still yet another feature of the present application provides wherein the compressor opening is an annular opening.

Yet another aspect of the present application provides an apparatus comprising a gas turbine engine having a compressor, a circumferential valve for delivering a working fluid through a flow path surface of the compressor to a bladed row of the compressor, an actuator structured to manipulate the circumferential valve between a relatively open position and a relatively closed position, and means for biasing the circumferential valve to one of a closed and open position.

A feature of the present application provides wherein the means for biasing is integral with the circumferential valve.

A further aspect of the present application provides a method comprising operating a gas turbine engine and flowing a working fluid through a compressor flow path of a compressor to a combustor, conveying a relatively pressurized fluid toward an opening in the compressor that leads to the compressor flow path, and actuating a compressor valve by moving a valve member in a circumferential direction to selectively contact a compressor valve seat, the pressurized fluid conveyed through the opening when the valve member is not in contact with the compressor valve seat.

A feature of the present application provides wherein the actuating includes circumferentially moving the valve member and changing a radial distance between a compressor valve member and a compressor valve seat to flow the relatively pressurized fluid through the opening and into the compressor.

Another feature of the present application provides wherein the valve member is a band that extends around the gas turbine engine, which further includes anchoring an end of the valve member to the gas turbine engine.

Still another feature of the present application further includes biasing the compressor valve to an open position with a spring.

Yet another feature of the present application further includes energizing an actuator to overcome the biasing and close the compressor valve.

A further feature of the present application provides wherein the energizing includes pressurizing a pneumatic actuator.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus comprising:
 a gas turbine engine having a compressor that includes a row of rotatable blades for compressing a working fluid between a first flow surface and a second flow surface of the compressor;
 a flow path operable to deliver an injection fluid radially inward to the compressor through an air flow port of the first flow surface;
 an air injection system for the compressor including a valve band extending across the air flow port and moveable in a circumferential direction relative to the gas turbine engine to selectively permit the injection fluid to flow into the compressor;

wherein the valve band includes a first end that is fixed relative to the gas turbine engine, wherein the valve band moves radially to open and close the air flow port, and which further includes a biasing member to resist closing of the air flow port with the valve band.

2. The apparatus of claim 1, wherein the injection fluid is working fluid withdrawn from the flow path of the gas turbine engine at a location axially downstream of the air flow port and the flow path is operable to deliver the injection fluid to a tip region of the compressor.

3. The apparatus of claim 1, wherein the gas turbine engine includes a plurality of compressor stages, a plurality of air flow ports leading to the plurality of compressor stages, and a plurality of valve bands that selectively permit flow into the compressor, each of the plurality of valve bands independently operable.

4. The apparatus of claim 1, further comprising an actuator coupled to the valve band that is operable between a first position and a second position wherein actuation of the actuator causes the valve band to circumferentially move to selectively open and close the air flow port.

5. The apparatus of claim 4, wherein the actuator is a pneumatic actuator that actuates the valve band in a linear direction.

6. An apparatus comprising:
a gas turbine engine having a compressor in fluid communication with a flow path structured to deliver a relatively pressurized fluid to a tip region of the compressor through a compressor opening;

a valve that selectively opens and closes the compressor opening to permit the relatively pressurized fluid into the compressor, the valve including a moveable component coupled to a biasing member that urges the valve to an open position, the moveable component coupled to an actuator capable of urging the valve to a closed position, wherein the moveable component is a band that extends circumferentially around the compressor, and wherein an end portion of the band is fixed relative to the gas turbine engine.

7. The apparatus of claim 6, wherein the band is constrained by a band guide surface.

8. The apparatus of claim 6, wherein the biasing member is integral with the moveable component.

9. The apparatus of claim 6, wherein the actuator is operable to variably position the valve between an open position and a closed position.

10. The apparatus of claim 6, wherein the compressor opening is an annular opening.

11. An apparatus comprising:
a gas turbine engine having a compressor;

a circumferential valve including a circumferential valve band for delivering a working fluid through a flow path surface of the compressor to a bladed row of the compressor;

an actuator structured to manipulate the circumferential valve between a relatively open position and a relatively closed position; and means for biasing the circumferential valve to one of a closed and open position, wherein the means for biasing is located radially between the flow path surface of the compressor and the circumferential valve band.

12. The apparatus of claim 11, wherein the means for biasing is integral with the circumferential valve.

13. A method comprising:
operating a gas turbine engine and flowing a working fluid through a compressor flow path of a compressor to a combustor;

conveying a relatively pressurized fluid toward an opening in the compressor that leads to the compressor flow path; and actuating a compressor valve by moving a valve member in a circumferential direction to selectively contact a compressor valve seat, the pressurized fluid conveyed through the opening when the valve member is not in contact with the compressor valve seat, and which further includes biasing the valve member to an open position with a spring.

14. The method of claim 13, wherein the actuating the compressor valve includes circumferentially moving the valve member and changing a radial distance between the valve member and the compressor valve seat to flow the relatively pressurized fluid through the opening and into the compressor.

15. The method of claim 13, wherein the valve member is a band that extends around the gas turbine engine, which further includes anchoring an end of the valve member to the gas turbine engine.

* * * * *